UNITED STATES PATENT OFFICE.

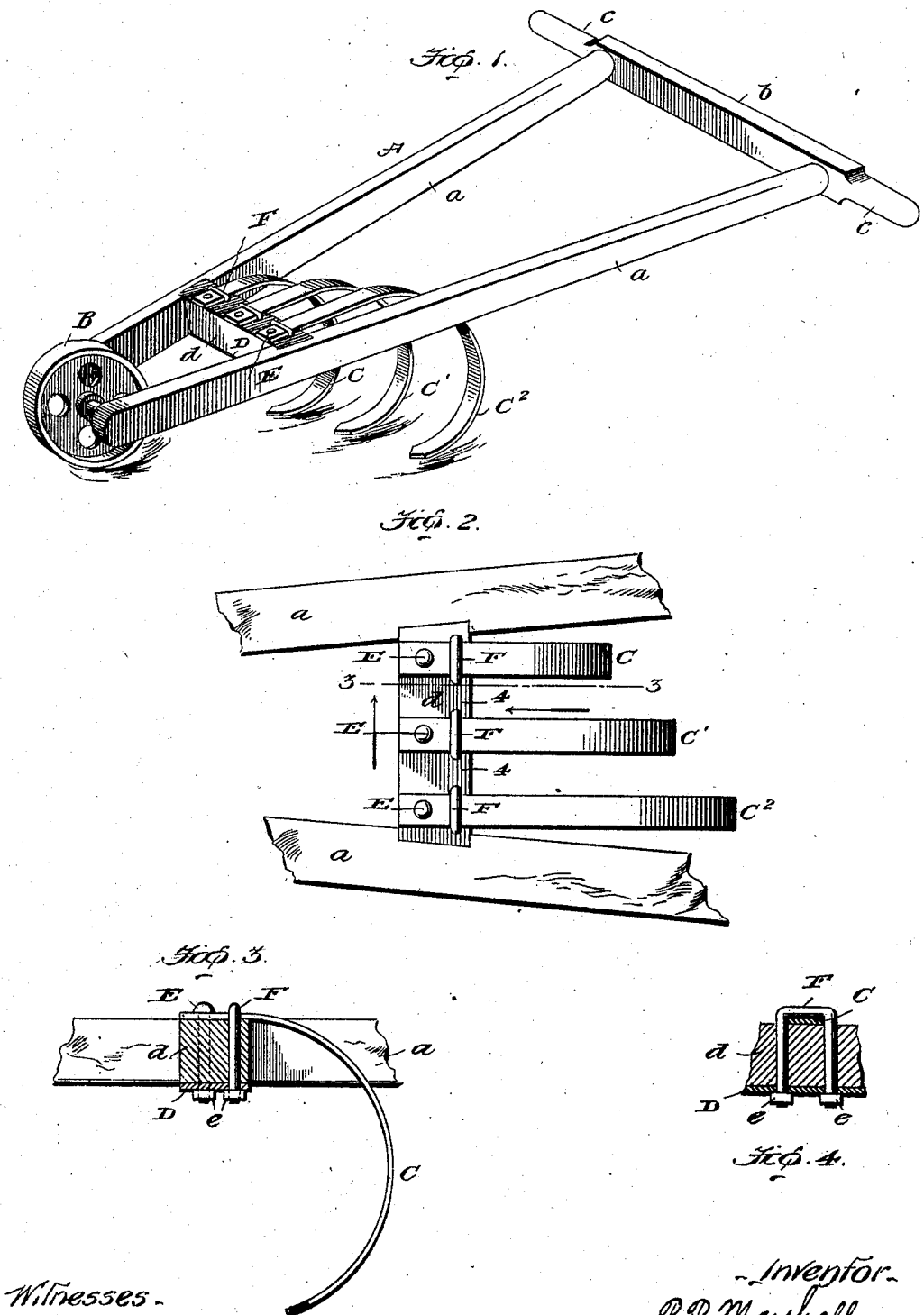

PHILIP P. MARSHALL, OF BELLGROVE, IDAHO.

HAND-CULTIVATOR.

No. 805,976.	Specification of Letters Patent.	Patented Nov. 28, 1905.

Application filed August 21, 1905. Serial No. 275,048.

*To all whom it may concern:*

Be it known that I, PHILIP P. MARSHALL, a citizen of the United States, residing at Bellgrove, in the county of Kootenai and State of Idaho, have invented new and useful Improvements in Hand-Cultivators, of which the following is a specification.

My invention pertains to hand-cultivators; and it consists in the easily-operated, efficient, and durable hand-cultivator hereinafter described, and particularly defined in the claim appended.

In the accompanying drawings, forming part of this specification, Figure 1 is a perspective view of my improved hand-cultivator. Fig. 2 is an enlarged detail top plan view illustrative of the manner in which the teeth are connected to the frame; and Figs. 3 and 4 are detail sections taken in the planes indicated by the lines 3 3 and 4 4, respectively, of Fig. 2.

Similar letters designate corresponding parts in all of the views of the drawings, referring to which—

A is the main frame of the cultivator. This frame is preferably made of wood and comprises forwardly-converging side bars $a$, a rear cross-bar $b$, fixed to the side bars and having handles $c$ extending beyond the same, and a forward cross-bar $d$, interposed between and fixed to the forward portions of the side bars.

B is a wheel which is mounted between the forward ends of the frame-bars $a$ and has for its purpose to support the forward portion of the cultivator and render easy the movement of the same over the ground, and C, C', and C² are teeth, of which three are preferably employed. These teeth are formed of thin strips of steel or other suitable material, and hence are highly resilient and adapted to give and move over stones, stumps, roots, and other obstructions in their paths without liability of being broken. The said teeth are preferably of different lengths in about the proportions shown and extend rearwardly from the upper side of the forward cross-bar $d$ of frame A and then downwardly and forwardly, so that their points rest in about the same horizontal plane as illustrated.

In fixedly connecting the forward portions of the spring-teeth to the frame-bar $d$ I make use of the plate D, the bolts E, and the shackles F. (Best shown in Figs. 2 to 4.) The plate D is disposed below the bar $d$, and the bolts E are passed downwardly through the teeth, the bar $d$, and the plate D in the order named, while the shackles F are arranged to straddle the teeth immediately in rear of the bolts and have their legs passed downwardly through the bar $d$ and the plate D. Below the plate D nuts $e$ are arranged on the bolts and the legs of the shackles, and hence it will be observed that while the teeth are securely and strongly connected to the frame A any one of the teeth may be readily removed when worn or broken and replaced with a new tooth without affecting the other teeth. It will also be observed that any one of the teeth may be readily replaced with a new tooth without entailing the employment of skilled labor or tools other than a common wrench.

In the practical use of the cultivator the operator grasps the handle $c$ and pushes the cultivator before him to and fro over the area to be cultivated. When this is done, it will be observed that the teeth will lightly work the soil, and this without liability of the teeth being injured or broken. This latter is due in large measure to the springiness of the teeth, which enables them to readily clear and move over obstructions in their paths. It will further be observed that the light spring-teeth adapt the cultivator to be pushed over the ground in an operating position with but a minimum amount of effort on the part of the operator.

Having described my invention, what I claim, and desire to secure by Letters Patent, is—

In a hand-cultivator, the combination with a frame comprising forwardly-converging side bars, a rear cross-bar fixed to the side bars and having handles extending beyond the same, and a forward cross-bar interposed between and fixed to the forward portions of the side bars; of a supporting-wheel mounted between the forward ends of the side bars of the frame, light, spring-teeth having their forward portions arranged on the upper side of the forward cross-bar of the frame, and extending rearwardly from said cross-bar and then downwardly and forwardly, a plate disposed at the under side of the forward cross-bar of the frame, bolts passed downwardly through the springs, the forward cross-bar of the frame and the plate in the order named, shackles disposed in rear of the bolts and straddling the springs and having their legs passed downwardly through the forward frame-bar and the plate, and nuts mounted on the lower ends of the bolts and the lower ends of the legs of the shackles.

In testimony whereof I have hereunto set my hand in presence of two subscribing witnesses.

PHILIP P. MARSHALL.

Witnesses:
 A. GRANTHAM,
 GEORGE HOWELL.